(12) United States Patent
Ramakrishnan et al.

(10) Patent No.: US 12,346,912 B2
(45) Date of Patent: Jul. 1, 2025

(54) SYSTEM AND METHOD FOR BALANCING PROCESSING LOAD DISTRIBUTION FOR DATA CENTERS BASED ON SERVER LOCATION TO MINIMIZE GREENHOUSE GAS EMISSIONS

(71) Applicant: Dell Products, LP, Round Rock, TX (US)

(72) Inventors: Malathi Ramakrishnan, Madurai (IN); Deeder M. Aurongzeb, Austin, TX (US); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 447 days.

(21) Appl. No.: 17/973,860

(22) Filed: Oct. 26, 2022

(65) Prior Publication Data
US 2024/0144292 A1  May 2, 2024

(51) Int. Cl.
*G06F 15/16* (2006.01)
*G06F 9/50* (2006.01)
(Continued)

(52) U.S. Cl.
CPC ......... *G06Q 30/018* (2013.01); *G06F 9/5088* (2013.01); *G06F 9/5094* (2013.01);
(Continued)

(58) Field of Classification Search
CPC ... G06Q 30/018; G06F 9/5088; G06F 9/5094; G06F 2209/501; G06F 2209/506; H04L 67/1012
(Continued)

(56) References Cited

U.S. PATENT DOCUMENTS 8,185,909 B2   5/2012  Sigal
8,396,986 B2 *  3/2013  Kanada ................. H04L 61/103
                                                 718/1
(Continued)

FOREIGN PATENT DOCUMENTS

EP    2 006 770 B1   1/2014
WO   2011/106160 A2   9/2011

OTHER PUBLICATIONS

C. Herrmann, et al., "Sustainability as Strategic Business Model for Profitable Business," 6 pages, May 2014.
(Continued)

*Primary Examiner* — Alicia Baturay
(74) *Attorney, Agent, or Firm* — Prol Intellectual Property Law, PLLC; H. Kenneth Prol (57) ABSTRACT

An enterprise-wide carbon dioxide ($CO_2$) emissions minimizing load-balancing system executing on a unified endpoint management platform information handling system comprising a processor receiving operational telemetry measurements for a first client information handling system including power analytics, a load of remote processing calls made to a processor, a geographic location, and a first client $CO_2$ emissions value determined to exceed a first $CO_2$ load-balancing emissions threshold value limiting the first client information handling system, the processor to reject remote processing call requests made to the first client information handling system above a $CO_2$ optimal request load determined based on $CO_2$ emitted per remote processing call request processed at the first client information handling system, and the processor to redistribute the rejected remote processing call requests across offload information handling systems having $CO_2$ emissions values below a per-machine $CO_2$ load-balancing emissions thresh-
(Continued)

old value determined for each of the offload information handling systems.

20 Claims, 4 Drawing Sheets

(51) Int. Cl.
G06Q 30/018 (2023.01)
H04L 67/1012 (2022.01)

(52) U.S. Cl.
CPC .... *H04L 67/1012* (2013.01); *G06F 2209/501* (2013.01); *G06F 2209/506* (2013.01)

(58) Field of Classification Search
USPC .......................................................... 709/203
See application file for complete search history.

(56) References Cited

U.S. PATENT DOCUMENTS

| | | | |
|---|---|---|---|
| 8,626,450 B2 | 1/2014 | Dooley | |
| 8,793,365 B2* | 7/2014 | Arsovski | G06F 9/5094 |
| | | | 709/224 |
| 9,183,327 B2 | 11/2015 | Keeli | |
| 9,210,100 B2* | 12/2015 | Van Der Linden | H04L 69/08 |
| 9,424,084 B2* | 8/2016 | Gupta | G06F 9/48 |
| 9,760,474 B2 | 9/2017 | Pillai | |
| 10,652,327 B2* | 5/2020 | Nidugala | G06F 9/5088 |
| 10,852,805 B2* | 12/2020 | Magcale | G06F 11/3006 |
| 11,221,595 B2* | 1/2022 | Radovanovic | G06Q 10/06315 |
| 11,644,804 B2* | 5/2023 | Radovanovic | G06F 9/4893 |
| | | | 700/291 |
| 11,782,770 B2* | 10/2023 | Baughman | G06F 9/5038 |
| | | | 718/104 |
| 11,842,213 B2* | 12/2023 | Katiyar | G06F 9/4893 |
| 11,847,007 B2* | 12/2023 | Magcale | G06F 11/3006 |
| 11,960,255 B2* | 4/2024 | Radovanovic | G06Q 10/06315 |
| 11,996,988 B1* | 5/2024 | Ramakrishnan | H04L 41/16 |
| 12,056,031 B2* | 8/2024 | Aurongzeb | G06F 11/3409 |
| 12,117,881 B2* | 10/2024 | Sethi | G06F 1/3206 |
| 12,197,756 B2* | 1/2025 | Doddaiah | G06F 3/0656 |
| 12,204,325 B2* | 1/2025 | Aurongzeb | G06Q 50/26 |
| 12,235,701 B2* | 2/2025 | Aurongzeb | G06F 1/3206 |
| 12,235,752 B2* | 2/2025 | Aurongzeb | G06F 11/3684 |
| 2004/0024861 A1 | 2/2004 | Coughlin | |
| 2008/0046895 A1 | 2/2008 | Dillenberger | |
| 2009/0276388 A1 | 11/2009 | Donohue | |
| 2009/0292617 A1 | 11/2009 | Sperling | |
| 2010/0070404 A1 | 3/2010 | McConnell | |
| 2014/0100937 A1 | 4/2014 | Na | |
| 2014/0181834 A1 | 6/2014 | Lim | |
| 2014/0316964 A1 | 10/2014 | Slutsker | |
| 2017/0123857 A1 | 5/2017 | Khan | |
| 2021/0004328 A1 | 1/2021 | Wang | |
| 2023/0385299 A1* | 11/2023 | Al Rasheed | G06F 16/258 |
| 2024/0012685 A1* | 1/2024 | Sousa | G06F 9/5027 |
| 2024/0028599 A1* | 1/2024 | Aurongzeb | G06F 16/24575 |
| 2024/0029078 A1* | 1/2024 | Aurongzeb | G06Q 30/018 |
| 2024/0037564 A1* | 2/2024 | Aurongzeb | G06Q 30/018 |
| 2024/0037566 A1* | 2/2024 | Aurongzeb | G06Q 30/018 |
| 2024/0037684 A1* | 2/2024 | Aurongzeb | G06Q 30/018 |
| 2024/0103051 A1* | 3/2024 | Aurongzeb | G06F 1/28 |
| 2024/0127262 A1* | 4/2024 | Aurongzeb | G06Q 10/20 |
| 2024/0134346 A1* | 4/2024 | Aurongzeb | G06Q 50/06 |
| 2024/0134716 A1* | 4/2024 | Aurongzeb | G06F 9/5083 |
| 2024/0146871 A1* | 5/2024 | Ramakrishnan | H04N 7/147 |
| 2024/0354172 A1* | 10/2024 | Aurongzeb | G06F 3/067 |
| 2024/0370397 A1* | 11/2024 | Ramakrishnan | G06F 13/4081 |
| 2024/0372784 A1* | 11/2024 | Sethi | H04L 41/12 |
| 2024/0396963 A1* | 11/2024 | Okamura | G06F 1/329 |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

SYSTEM AND METHOD FOR BALANCING PROCESSING LOAD DISTRIBUTION FOR DATA CENTERS BASED ON SERVER LOCATION TO MINIMIZE GREENHOUSE GAS EMISSIONS

FIELD OF THE DISCLOSURE

The present disclosure generally relates to minimizing an amount of greenhouse gas emissions that may be attributable to operation of an information handling system. More specifically, the present disclosure relates to an enterprise-wide carbon dioxide (CO2) emissions minimizing load balancing system for balancing processing requests across a plurality of client information handling systems within an enterprise system, such as at plural data centers, to minimize enterprise-wide CO2 emissions due to operation of such client information handling systems.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Load-balancing of processing requests across enterprise systems comprising a plurality of client information handling systems or servers is essential to efficient operation of server farms, or data centers for cloud computing providers and customers. Enterprise systems often access a large number of client information handling systems in various locations within one or more geographic regions (e.g., within the United States, Europe, the Europe, Middle East, Africa (EMEA) region, or globally). Many systems exist for optimizing distribution of processing requests across a plurality of such client information handling systems located in various places for data centers around the world in order to maximize the speed, efficiency, or throughput (e.g., number of calls processed within a set period of time) of the overall enterprise system or across all participating client information handling systems. However, a system for distributing such processing requests so as to minimize carbon dioxide (CO2) or other greenhouse gas (GHG) emissions is needed.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. Further, such emissions may also influence a cloud computing customer's selection of cloud-based computing resources, including client information handling systems such as servers operated within one or more data centers for a larger enterprise system. GHGs emitted by any given client information handling system (e.g., server) within an enterprise network may be dependent upon power consumed during operation of the client information handling system, and geographic location of the client information handling system. For example, client information handling systems may cause the emission of GHGs by consuming power delivered by power stations that burn fossil fuels, or capture more environmentally friendly solar, wind, or water power. The type of power plant providing such power for consumption by the client information handling system, and consequently, the GHGs emitted during consumption of power may depend upon the geographic location at which such power is consumed. The amount of GHGs emitted during production of each kilowatt-hour (kWh) of power may vary greatly across different geographic regions. For example, on average, power plants within India may emit 1.82 pounds of carbon dioxide (CO2)

per kWh of power delivered, while power plants within France may emit 0.136 pounds of $CO_2$ (e.g., one-tenth that of India) per kWh of power delivered.

The enterprise-wide $CO_2$ emissions minimizing load balancing system in embodiments of the present disclosure address this issue by determining an optimal distribution of processing requests across a plurality of client information handling systems located at various places around the planet so as to minimize $CO_2$ emissions. Such a load-balancing method may be triggered in various embodiments described herein based on routinely gathered operational telemetry measurements of a client information handling system indicating that the client information handling system is currently emitting $CO_2$ above a $CO_2$ load-balancing emissions threshold value unique to that client information handling system. Such operational telemetry measurements in various embodiments described herein may include, for example, power analytics including power consumption, remote processor call request load, and geographic location. The enterprise-wide $CO_2$ emissions minimizing load balancing system in embodiments may determine such a $CO_2$ load-balancing emissions threshold value for triggering instructions to cap and redistribute remote processor call requests currently routed to the first client information handling system emitting $CO_2$ above its threshold value based on an average of $CO_2$ emissions values previously determined for that first client information handling system or a plurality of candidate offload client information handling systems. For example, the $CO_2$ load-balancing emissions threshold value determined for a first client information handling system may be determined by taking an average of all determined $CO_2$ emissions values for all client information handling systems located within the same data center, same city, or same country as the first client information handling system. By setting the trigger for rebalancing of remote processor calls based on such average $CO_2$ emissions values of some set of client information handling systems, the enterprise-wide $CO_2$ emissions minimizing load balancing system in embodiments described herein may more evenly distribute $CO_2$ emissions by client information handling systems processing such remote processor call requests within an enterprise system.

Upon determination of the $CO_2$ load-balancing emissions threshold value that the enterprise-wide $CO_2$ emissions minimizing load balancing system allows each individual client information handling system to emit, as described directly above, the enterprise-wide $CO_2$ emissions minimizing load balancing system may begin routinely monitoring each of a plurality of client information handling systems across many locations of an enterprise system. When any one of such client information handling systems begins emitting $CO_2$ above its machine-specific $CO_2$ load-balancing emissions threshold value, the enterprise-wide $CO_2$ emissions minimizing load balancing system in embodiments may determine a maximum number of remote processor call requests that that client information handling system may process while limiting its $CO_2$ emissions to its machine-specific $CO_2$ load-balancing emissions threshold value. This limits the $CO_2$ emissions from that client information handling system. The enterprise-wide $CO_2$ emissions minimizing load balancing system in embodiments may then transmit a capping instruction to limit the number of remote processing calls routed to the client information handling system currently emitting $CO_2$ above its machine-specific $CO_2$ load-balancing emissions threshold value to the maximum number of remote processor call requests that that client information handling system may process while limiting its $CO_2$ emissions to its machine-specific $CO_2$ load-balancing emissions threshold value. In such a way, the enterprise-wide $CO_2$ emissions minimizing load-balancing system may define $CO_2$ emissions value each client information handling system may emit before triggering a capping limitation instruction of processing requests at that client information handling system in order to minimize $CO_2$ emissions across the entire enterprise.

The enterprise-wide $CO_2$ emissions minimizing load-balancing system in embodiments of the present disclosure may also reroute or redistribute any processing requests rejected by a first client information handling system pursuant to such capping limitation instruction of requests at the first client information handling system so as to further minimize $CO_2$ emissions. For example, the enterprise-wide $CO_2$ emissions minimizing load-balancing system in embodiments may prioritize redistribution of rejected processing requests to other client information handling systems within the enterprise likely to emit less $CO_2$ during processing of such requests. More specifically, such rejected requests may be redistributed to prioritize client information handling systems located in a geographic region that emits less $CO_2$ per kWh of power generated than that of the geographic location for the first client information handling system. In another example, such rejected requests may be redistributed to prioritize client information handling systems capable of consuming less power than the first client information handling system while processing the same amount of remote processor call requests as the first client information handling system. In such a way, the enterprise-wide $CO_2$ emissions minimizing load-balancing system optimally distribute processing requests across a plurality of client information handling systems located at various places around the planet so as to minimize $CO_2$ emissions across an entire enterprise system.

Figure 1:
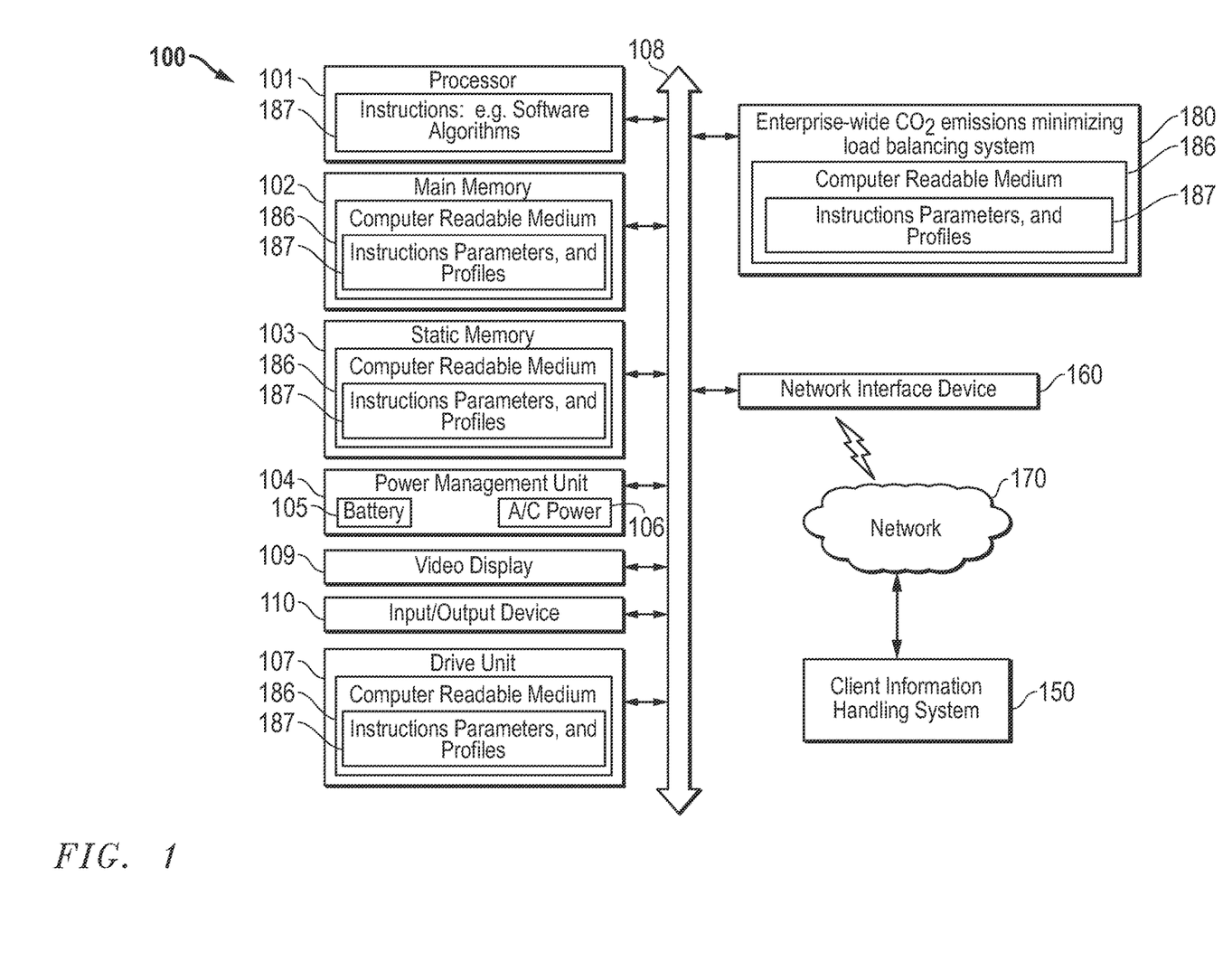
FIG. 1 is a block diagram illustrating a cloud-based Unified Endpoint Management (UEM) platform information handling system according to an embodiment of the present disclosure.

FIG. 1 illustrates an information handling system 100 according to several aspects of the present disclosure. As described herein, an information handling system 180 may execute code instructions of an enterprise-wide $CO_2$ emissions minimizing load-balancing system 180 operating at a Unified Endpoint Management (UEM) platform information handling system to optimally distribute processing requests across a plurality of client information handling systems (e.g., 150) at various geographic locations within an enterprise system managed at the UEM platform so as to minimize $CO_2$ emitted during processing of such requests across all client information handling systems (e.g., 150) of the enterprise system. Such a $CO_2$ optimized load-balancing method may be triggered upon a client information handling system (e.g., 150) emitting $CO_2$ at a level reaching or exceeding a $CO_2$ load-balancing emissions threshold value specific to that client information handling system (e.g., 150) determined based on processor load, power consumption, or geographic location of the client information handling system (e.g., 150). Some or all of portions and components information handling system 100 in FIG. 1 may also represent one or more client device information handling systems according to embodiments herein, also shown at client information handling system 150 when information handling system 100 serves as a UEM platform. Client device operational telemetry measurements including power analytics, a load of remote processing calls made to a hardware processor, geographic location, as well as determined $CO_2$ emissions values particular to each client information handling systems (e.g., 150) may be gathered during routine monitoring periods from a plurality of client information handling systems (e.g., 150) at the UEM platform 100 executing the enterprise-wide CO2 emissions minimizing load-balancing system 180. Some or all of the information handling system 100 of FIG. 1 may operate at a UEM platform information handling system or as a client information handling system according to various embodiments herein.

Using these crowd-sourced operational telemetry measurements from a plurality of client information handling systems (e.g., 150), and CO2 emissions values, the enterprise-wide CO2 emissions minimizing load-balancing system 180 executing on a hardware processor 101 in embodiments herein may set a trigger CO2 load-balancing emissions threshold for rebalancing and redistribution of remote processor calls for each of the plurality of client information handling systems (e.g., including a first client information handling system 150 and a plurality of candidate offload client information handling systems) to more evenly distribute CO2 emissions by client information handling systems processing such remote processor call requests within an enterprise system. Upon detecting that the client information handling system 150 has reached the CO2 load-balancing emissions threshold value, the enterprise-wide CO2 emissions minimizing load-balancing system 180 trained neural network operating at the UEM platform 100 in an embodiment may then send an instruction to cap processing requests accepted by the client information handling system 150 and redistribute any processing requests rejected by the client information handling system 150 across one or more client information handling systems currently emitting less CO2 than the client information handling system 150.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions of the enterprise-wide CO2 emissions minimizing load-balancing system 180, the wireless network interface device 160, a static memory 103 or drive unit 107, a, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the enterprise-wide CO2 emissions minimizing load-balancing system 180, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing an enterprise-wide CO2 emissions minimizing load-balancing system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6*e*. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to optimally distribute processing requests across a plurality of client information handling systems at various geographic locations so as to minimize CO2 emitted during processing of such requests across all client information handling systems. For example, instructions 187 may include a particular example of an enterprise-wide CO2 emissions minimizing load-balancing system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The enterprise-wide CO2 emissions minimizing load-balancing system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the enterprise-wide CO2 emissions minimizing load-balancing system 180, firmware or software algorithms, processes, and/or methods may be stored here. Such code instructions 187 may comprise capping processing requests accepted at a first client information handling system 150 at which a CO2 load-balancing emissions threshold value has been met at that client information handling system 150 and rerouting all rejected processing calls to other client information handling systems currently emitting less CO2 than the first client information handling system 150. The enterprise-wide CO2 emissions minimizing load-balancing system 180 may operate on hardware processing resources within a Unified Endpoint Management (UEM) platform 100 that gathers telemetries from a plurality of client information handling systems (e.g., 150) endpoints via the network 170 that describe operating environments for those client information handling systems (e.g., 150). The UEM platform 100 in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the enterprise-wide CO2 emissions minimizing load-balancing system 180 may be stored in static memory 103, or the drive unit 107 on a computer-readable medium 186 such as a flash memory or magnetic disk in an example embodiment. More specifically, telemetries describing noise measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® Core class hardware processor, ARM® brand hardware processors, Qualcomm® Snapdragon hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 150 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
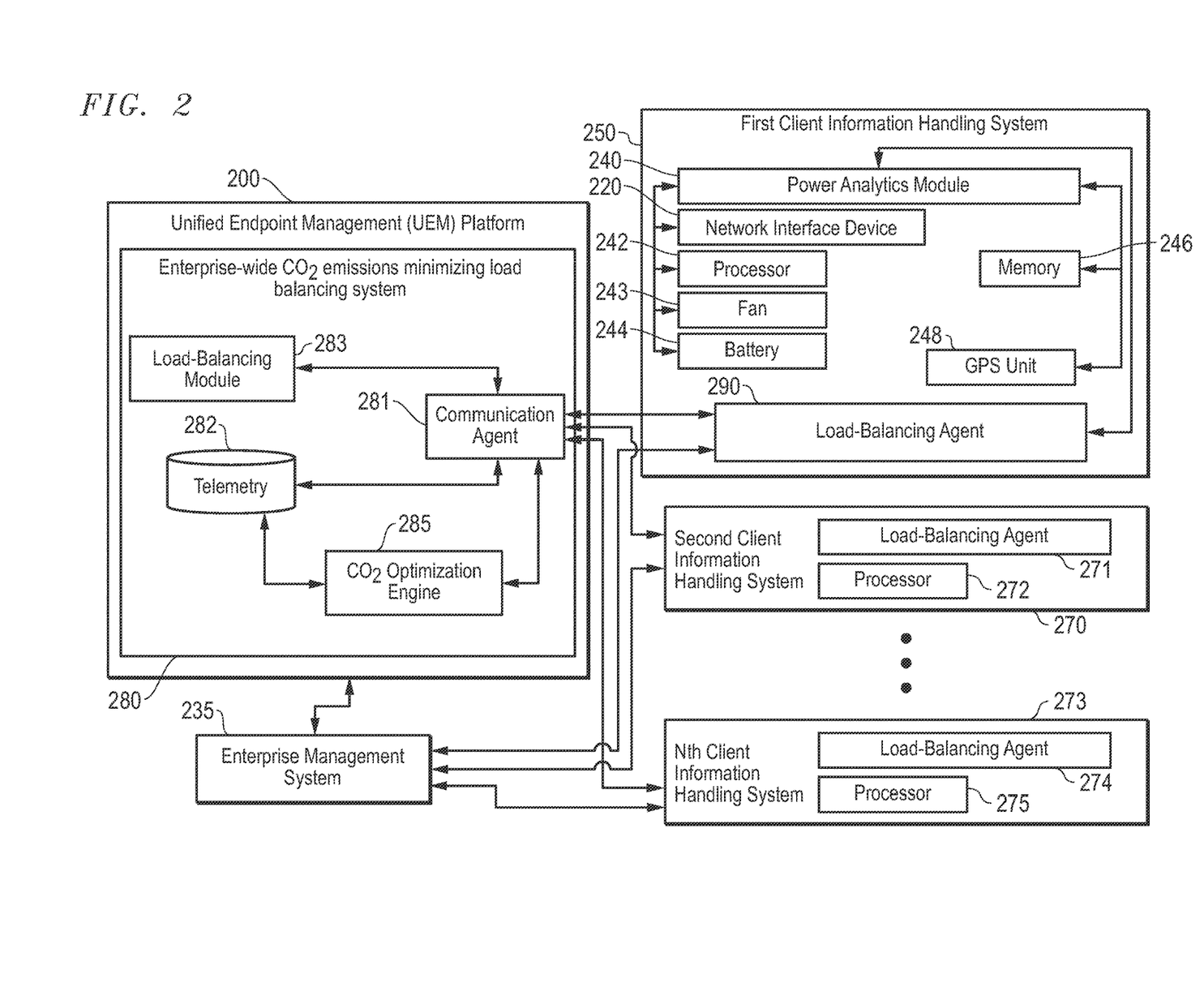
FIG. 2 is a block diagram illustrating an enterprise-wide carbon dioxide (CO2) emissions minimizing load-balancing system executing on a UEM information handling system with plural client information handling systems according to an embodiment of the present disclosure.

FIG. 2 is a block diagram illustrating an enterprise-wide carbon dioxide (CO2) emissions minimizing load-balancing system 280 for optimally distributing processing requests across a plurality of client information handling systems (e.g., 250, 270, and 273), which may operate as servers, at various geographic locations so as to minimize CO2 emitted during processing of such requests. Such a CO2 optimized load-balancing method may be triggered upon a client information handling system 250 reaching or exceeding a CO2 load-balancing emissions threshold value determined specifically for that client information handling system 250 based on processor load, power consumption, or geographic location of the client information handling system 250.

A unified endpoint management (UEM) platform 200 in an embodiment may execute an enterprise-wide CO2 emissions minimizing load-balancing system 280 to set a trigger CO2 load-balancing emissions threshold for rebalancing of remote processor calls for each of the plurality of client information handling systems (e.g., 250, 270, or 273) to more evenly distribute CO2 emissions by client information handling systems (e.g., 250, 270, or 273) processing such remote processor call requests within an enterprise system. Client device operational telemetry measurements including power analytics, a load of remote processing calls made to a hardware processor, geographic location, as well as determined CO2 emissions values particular to each client information handling systems (e.g., 250, 270, or 273) may be gathered during routine monitoring periods from a plurality of client information handling systems (e.g., 250, 270, or 273) at the UEM platform 200 executing the enterprise-wide CO2 emissions minimizing load-balancing system 280. Each of a plurality of client information handling systems (e.g., 250, 270, and 273) may be under management of or in communication with an enterprise management system 235, which may act as an interface between the client information handling system (e.g., 250, 270, or 273) and the UEM platform 200. The UEM platform 200 executing code instructions of the enterprise-wide CO2 emissions minimizing load-balancing system 280 may determine when a first client information handling system (e.g., 250) has reached the CO2 load-balancing noise threshold value for that system (e.g., 250). The enterprise-wide CO2 emissions minimizing load-balancing system 280 operating at the UEM platform 200 in an embodiment may then generate an instruction to cap processing requests accepted by the client information handling system 250 and redistribute any processing requests rejected by the first client information handling system 250 across one or more candidate offload client information handling systems (e.g., 270, or 273) currently emitting less CO2 than the client information handling system 250.

The UEM platform 200 in an embodiment may operate as a cloud-based service in communication with the enterprise management system 235 via a network to identify information technology (IT) issues at a first client information handling system 250, a second client information handling system 270, or a plurality of other client information handling systems within say, a data center, up to an Nth client information handling system 273. Each of the client information handling systems (e.g., 250, 270, and 273) may also include, at least a load-balancing agent (290, 271, or 274, respectively) and a processor (e.g., 247, 272, or 275, respectively). The UEM platform 200 and enterprise management system 235 may also provide support for such issues, including automatically updating drivers or hardware components, as needed. In a specific embodiment of the present disclosure, the UEM platform 200 may gather operational telemetry measurements from a plurality of client information handling systems (e.g., 250, 270, and 273) that describe operating environments for those client information handling systems (e.g., geographic location, power consumption analytics, or analytics for software usage) at one or more data centers.

Each client information handling system (e.g., 250, 270, or 273) in an embodiment may include a plurality of hardware components. For example, a first client information handling system 250 in an embodiment may include a network interface device 220, a hardware processor (e.g., central processing unit (CPU), graphics processing unit (GPU), or visual processing unit (VPU)) 242, a memory 246, a fan 243, and one or more components of a power supply unit (e.g., battery 244). In some embodiments, the first client information handling system 250 may further include one or more sensing devices, such as location sensing devices 248 (e.g., GPS location unit), or one or more peripheral devices for example. One or more of the other hardware components described herein (e.g., 220, 242, 243, 244, 246, or 248) may further operate according to firmware or driver instructions in an embodiment.

A power analytics module 240 in an embodiment may be in communication with the various hardware components (e.g., 220, 242, 243, 244, 246, or 248) and firmware for those components in an embodiment. For example, the power analytics module 240 may monitor power consumption by each of the various hardware components (e.g., 220, 242, 243, 244, 246, or 248) in an embodiment. In another example embodiment, the power analytics module 240 may also access firmware for hardware components (e.g., 220, 242, 243, 244, 246, or 248) to determine policies or settings for those components at the time of such power measurements. The power analytics module 240, along with the load-balancing agent 290 may also receive load-balancing user instructions to cap a number of processing resources made available for remote processing requests received from remote client information handling systems via the network interface device 220 or to reroute received processing requests exceeding such a cap to other client information handling systems (e.g., 270, or 273) also managed by the enterprise management system 235 at one or more data centers.

More specifically, the power analytics module 240 in an embodiment may determine current usage as a percentage of total capacity for the hardware processor 242 (e.g., central processing unit (CPU), graphics processing unit (GPU), or visual processing unit (VPU)). In another example, the power analytics module 240 may determine a remote processing request load (e.g., in calls processed per second, minute, or hour) for requests received from remote devices (e.g., via network interface device 220) to perform processing calls via processor 242. In still another example, the power analytics module may determine current usage as a percentage of total capacity for memory 246, time required to process requests to access such memory 246, and identify software applications most frequently accessing such memory 246. All information accessed in such a way by the power analytics module 240 in an embodiment may be communicated to a data collector 261.

The power analytics module 240 in an embodiment may also be capable of assessing and adjusting such policies within firmware for one or more hardware components, upon user approval. For example, the power analytics module 240, along with the load-balancing agent 290 may also cap a number of processing resources made available for remote processing requests received from remote client information handling systems via the network interface device 220 or reroute received processing requests exceeding such a cap to other client information handling systems (e.g., 270, or 273) also managed by the enterprise management system 235.

The data collector 261 may routinely collect information from the power analytics module 240 at preset intervals, or may do so upon notification by the power analytics module 240 of a specific event, failure, or warning. Information recorded by the power analytics module 240 may be output into reports. The format of such a report may vary, which may require reformatting of such information into an easily classified, sorted, and searchable format. Thus, the data collector 261 in an embodiment may operate to reformat any received reports into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The data collector 261 in an embodiment may transmit information received at any given time from the power analytics module 240 and reformatted to a predetermined data interchange format (e.g., JSON) to a load-balancing agent 290. Such a JSON-formatted report may be referred to herein as a JSON event. Each JS ON event may include any information gathered from the power analytics module 240 and a time stamp associated with either the time the analytics module report was generated, or the time at which any given measurement within the report was made. In some cases, a JSON event may include a single notification or warning from an analytics module. In other cases, a JSON event may include routinely gathered information such as current configurations or policies for various hardware components (e.g., 220, 242, 243, 244, 246, or 248), power consumption of those components over a known monitoring time period, geographic location, or ambient temperature or humidity for that geographic location. In some cases, the ambient temperature or humidity for that geographic location may be drawn from a database recording such values for a plurality of geographic locations around the world. One or more of such JSON events may be combined into a single JSON incident in various embodiments described herein.

As described herein, the UEM platform 200 in an embodiment may gather JSON incidents, like the one described directly above, routinely from a plurality of client information handling systems operating under different environmental conditions and usage patterns. These JSON incidents may first be gathered during a training period during which the enterprise-wide $CO_2$ emissions minimizing load-balancing system 280 may determine a $CO_2$ load-balancing emissions threshold value for triggering redistribution of remote processor call requests for each of the client information handling systems (e.g., 250, 270, and 273) individually. The enterprise-wide $CO_2$ emissions minimizing load-balancing system 280 in an embodiment may also refer to JSON incidents gathered during such a training period to determine the $CO_2$ emissions values for each client information handling system (e.g., 250, 270, or 273). As described herein, $CO_2$ emitted by any given client information handling system (e.g., 250, 270, or 273) within an enterprise network may be dependent upon power consumed during operation of the client information handling system (e.g., 250, 270, or 273), and geographic location (e.g., India or France, respectively) of the client information handling system (e.g., 250, 270, or 273). For example, client information handling systems (e.g., 250, 270, or 273) may cause the emission of $CO_2$ by consuming power delivered by power stations that burn fossil fuels, or capture more environmentally friendly solar, wind, or water power. The type of power plant providing such power for consumption by the client information handling system (e.g., 250, 270, or 273), and consequently, the $CO_2$ emitted during consumption of power may depend upon the geographic location (e.g., India, or France, respectively) at which such power is consumed.

The amount of $CO_2$ emitted during production of each kilowatt-hour (kWh) of power may vary greatly across different geographic regions. For example, on average, power plants within India, where the first client information handling system 250 may be operating, may emit 1.82 pounds $CO_2$ per kWh of power delivered. In contrast, power plants within France, where the second client information handling system 270 may be operating, may emit 0.136 pounds of $CO_2$ per kWh of power delivered. In such a scenario, the first client information handling system 250 may cause more than ten times as much $CO_2$ emissions than the second client information handling system 270 by drawing the same amount of power consumed at the second client information handling system 270. The $CO_2$ optimization engine 285 in an embodiment may transmit these location-specific $CO_2$ emissions per kWh consumed for the geographic location of the client information handling system (e.g., 250, 270, or 273) to each of the client information handling systems (e.g., 250, 270, or 273). The load-balancing agent 290 in an embodiment may multiply these received location-specific $CO_2$ emissions per kWh by the power consumed over a set period of time to determine a $CO_2$ emissions value for each JSON incident generated by each client information handling system. The load-balancing agent 290 may further include such determined $CO_2$ emissions values within each JSON incident prior to transmission of the JSON incidents to the communication agent 281.

The enterprise-wide $CO_2$ emissions minimizing load-balancing system 280 may determine, for each client information handling system individually (e.g., 250, 270, and 273 individually) an average amount of $CO_2$ emitted. This average amount of $CO_2$ emitted during a training period may be used as a target maximum $CO_2$ emissions value for future operation of each client information handling system. Because such a training period may occur immediately after initial use of the client information handling system (e.g., 250, 270, or 273), and because power consumption efficiency may decrease as each client information handling system (e.g., 250, 270, or 273) ages, the $CO_2$ emitted during the training period may indicate the $CO_2$ emitted while the each client information handling system is operating at peak efficiency with respect to its life cycle. As these client information handling systems (e.g., 250) age and consume a greater amount of power to perform the same number of processing calls, it may become appropriate to offload some of these processing calls to other, more power-efficient client information handling systems (e.g., 270, or 273). In some embodiments, the target maximum $CO_2$ emissions value that may trigger such redistribution of remote processing call requests may be set according to an average of $CO_2$ emissions across a plurality of client information handling systems drawing power from sources having similar $CO_2$ emissions rates per kWh of power produced or may draw power from diverse sources having differing $CO_2$ emissions rates per kWh. For example, the enterprise-wide $CO_2$ emissions minimizing load-balancing system 280 may set a $CO_2$ load-balancing emissions threshold value trigger for such a redistribution of remote processor call requests as the average $CO_2$ emissions value across all client information handling systems within the same data center, the same city, or the same country.

Upon determination of the maximum $CO_2$ load-balancing emissions threshold value that the enterprise-wide $CO_2$ emissions minimizing load-balancing system 280 allows an individual client information handling system 250 to emit, as described directly above, the enterprise-wide $CO_2$ emissions minimizing load-balancing system may determine how much $CO_2$ is emitted per remote processing call request processed by the processor 242 at the first client information handling system 250. This determination of $CO_2$ emitted per request may also be performed for one or more candidate offload client information handling systems (e.g., 270 and 273) that may be available for redistribution of such remote processing call requests. Further, this determination may be used by the enterprise-wide $CO_2$ emissions minimizing load balancing system 280 to determine a number of remote processing call requests the first client information handling system 250 and candidate offload client information handling systems (e.g., 270 and 273) may be capable of handling before meeting their respective machine-specific $CO_2$ load-balancing emissions threshold values. For example, the enterprise-wide $CO_2$ emissions minimizing load-balancing system 280 in an embodiment may determine, based on the $CO_2$ emitted per processing call request determined for the first client information handling system 250, a maximum processing call request load capacity that the first client information handling system 250 may handle while emitting $CO_2$ below the $CO_2$ load-balancing emissions threshold value determined for the first client information handling system.

Each client information handling system (e.g., 250, 270, or 273) in an embodiment may then enter routine load-balancing monitoring intervals in which JSON incidents continue to be generated and transmitted to the enterprise-wide $CO_2$ emissions minimizing load-balancing system 280. The load balancing agent (e.g., 290 or 271) operating at each client information handling system (e.g., 250, 270, or 273) be code instructions executing on a processing resource such as a microcontroller and may generate and transmit to the UEM platform 200 such monitoring JSON incidents to include all previously described operational telemetry measurements (e.g., power analytics and consumption, geographic location, remote processing request load, and determined $CO_2$ emissions values). In an embodiment in which such a monitoring period JSON incident includes a determined $CO_2$ emissions value identified by the enterprise-wide $CO_2$ emissions minimizing load-balancing system 280 as meeting the $CO_2$ load-balancing emissions threshold value for that client information handling system (e.g., 250), the enterprise-wide $CO_2$ emissions minimizing load-balancing system 280 may notify the load-balancing module 283. In an embodiment, the load-balancing module 283 may identify one or more other client information handling systems (e.g., 270, or 273) also managed by the enterprise management system 235 as candidates to receive a portion of the remote processing calls currently being routed to the first client information handling system 250. The load-balancing module 283 may operate to determine an optimal method for redistributing a portion of those remote processing calls currently routed to the first client information handling system 250 across such other client information handling systems (e.g., including 270).

The load-balancing module 283 may identify one or more candidate offload client information handling systems (e.g., 270, or 273) that may be capable of handling a portion of the current request load for the first client information handling system 250 while minimizing $CO_2$ emissions. For example, the load-balancing module 283 in an embodiment may identify any client information handling systems (e.g., 270 or 273) within the enterprise system currently emitting $CO_2$ below its machine-specific $CO_2$ load-balancing emissions threshold value as a candidate offload client information handling system. Upon identification of all candidate offload client information handling systems (e.g., including 270), the load-balancing module 283 may determine, based on the $CO_2$ emitted per processing call request determined for each of the candidate offload client information handling systems (e.g., 270 and 273), a number of remote processing call requests that may be rerouted from the first client information handling system 250 to each candidate offload client information handling system (e.g., 270 and 273) while limiting $CO_2$ emitted at each of the candidate offload client information handling systems (e.g., 270 and 273) to the $CO_2$ load-balancing emissions threshold values determined for each of the candidate offload client information handling systems (e.g., 270 or 273). This capacity of remote processing call requests that may be rerouted from the first client information handling system 250 to each candidate offload client information handling system (e.g., 270 or 273) as described directly above may be referred to herein as a $CO_2$ emissions offload capacity of a candidate offload client information handling system (e.g., 270 or 273). Based on this $CO_2$ emissions offload capacity or capability determined for each of the candidate offload client information handling systems (e.g., including 270) in an embodiment, the load-balancing module 283 may determine a percentage of the current remote processing request load for the first client information handling system 250 that may be rerouted to each of the candidate offload client information handling systems to minimize $CO_2$ emissions across all client information handling systems (e.g., including 250, 270, and 273) managed by the enterprise management system 235.

The load-balancing module 283 may transmit a capping instruction to the load-balancing agent 290 to cap the number of remote processing calls to the processor 242 for client information handling system 250 at the maximum processing call request load that the enterprise-wide $CO_2$ emissions minimizing load balancing system determined that the first client information handling system 250 may handle while emitting $CO_2$ below the $CO_2$ load-balancing emissions threshold value also determined for the first client information handling system. The load-balancing agent 290 in such an embodiment may work in tandem with the power analytics module 240 to cap the resources for the processor 242 for client information handling system 250 may available pursuant to execution of such received remote processor calls. In such a way, the load-balancing agent 290 and power analytics module 240 may limit the number of remote calls to the processor 242 to a number of calls that the first client information handling system 250 may handle to a $CO_2$ optimal request load while emitting $CO_2$ below the $CO_2$ load-balancing emissions threshold value determined for the first client information handling system.

In an embodiment, the load-balancing module 283 may also orchestrate rerouting or redistribution any processing requests rejected by the first client information handling system 250 pursuant to such capping of requests at the first client information handling system 250 so as to further minimize $CO_2$ emissions. The load-balancing module 283 may follow any currently known or future developed methods of load-balancing, as informed by the determined $CO_2$ emissions values for each of the candidate offload client information handling systems (e.g., including 270) to perform such a process in an embodiment. For example, the enterprise-wide $CO_2$ emissions minimizing load-balancing system 280 and load-balancing module 283 in an embodiment may prioritize redistribution of rejected processing requests (up to the determined $CO_2$ emissions offload capability for that candidate) to candidate offload client information handling systems (e.g., including 270) currently emitting less $CO_2$ or currently capable of processing more requests using the same amount of power used by the first client information handling system 250. In another example, such rejected requests may be redistributed to prioritize client information handling systems (e.g., 270, or 273) located in a geographic region that emits less $CO_2$ per kWh of power generated than that of the geographic location for the first client information handling system or other candidate offload client information handling systems. In such a way, the enterprise-wide $CO_2$ emissions minimizing load-balancing system optimally distribute processing requests across a plurality of client information handling systems located at various places or data centers around the planet so as to minimize $CO_2$ emissions.

Figure 3:
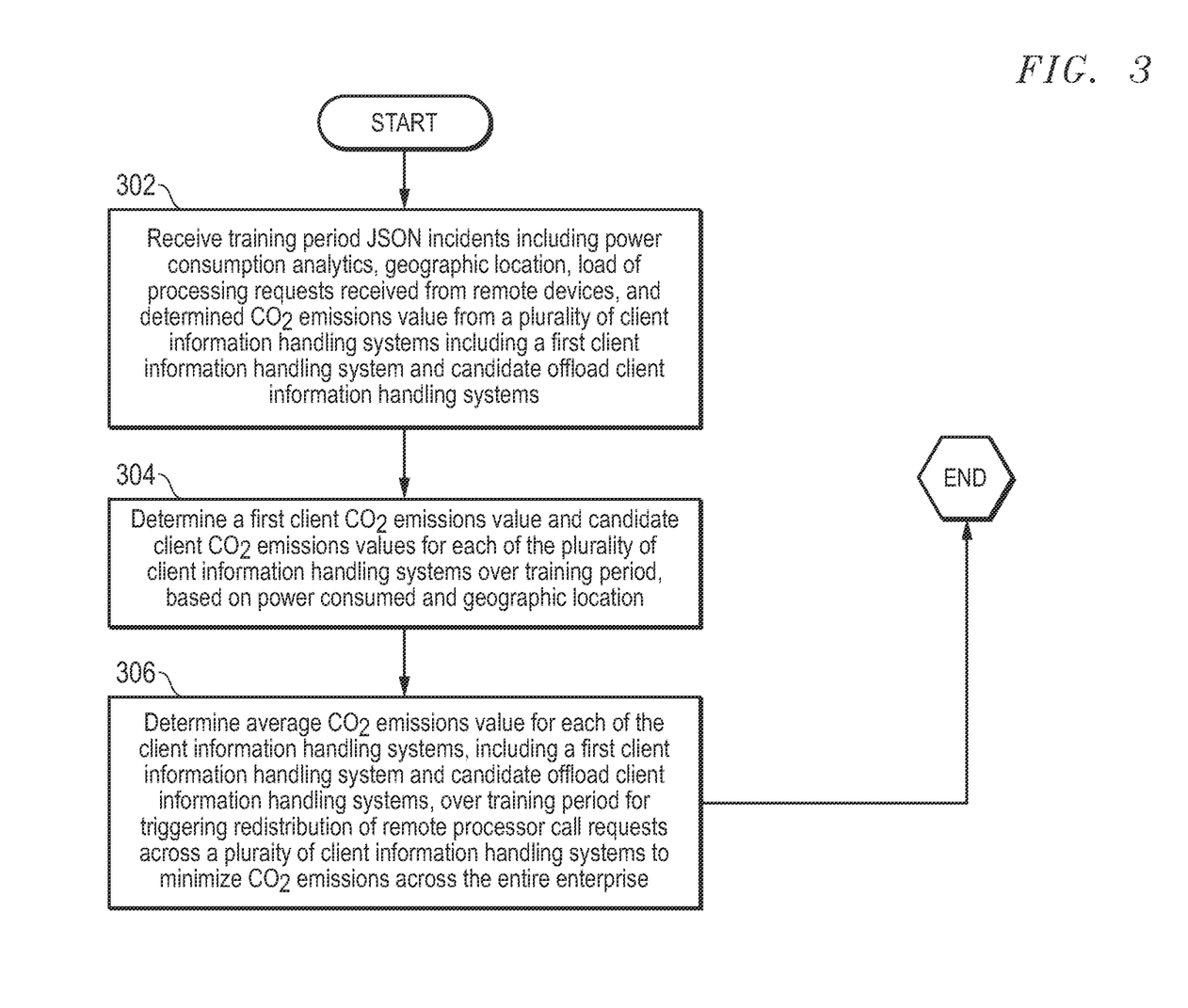
FIG. 3 is a flow diagram illustrating a method of determining a CO2 load-balancing emissions threshold value for triggering load-balancing to minimize CO2 emissions at a client information handling system according to an embodiment of the present disclosure.

FIG. 3 is a flow diagram illustrating a method of determining, for each of a plurality of client information handling systems of an enterprise system, a carbon dioxide ($CO_2$) load-balancing emissions threshold value for triggering execution of processor request load-balancing to minimize $CO_2$ emissions across an enterprise according to an embodiment of the present disclosure. As described herein, the UEM platform may have hardware processing resources such as a microcontroller execute code instructions of an enterprise-wide $CO_2$ emissions minimizing load balancing system in an embodiment that may determine an optimal distribution of processing requests across a plurality of client information handling systems located at various places around the planet so as to minimize $CO_2$ emissions. Such a load-balancing method may be triggered in various embodiments described herein based on routinely gathered operational telemetry measurements of a first client information handling system indicating that the first client information handling system is currently emitting $CO_2$ above a first $CO_2$ load-balancing emissions threshold value unique to that first client information handling system. The enterprise-wide $CO_2$ emissions minimizing load balancing system in an embodiment may determine such a $CO_2$ load-balancing emissions threshold value that may trigger capping and redistribution of remote processor call requests currently routed to the first client information handling system when it is emitting $CO_2$ above its threshold value based on an average of $CO_2$ emissions values previously determined for that first client information handling system or from a plurality of candidate offload client information handling systems across some portion or all of an enterprise, as described in greater detail below.

At block 302, the enterprise-wide $CO_2$ emissions minimizing load-balancing system in an embodiment may receive training period JSON incidents including power consumption analytics, geographic locations, load of processing requests received from remote devices, and determined $CO_2$ emissions value from a plurality of client information handling systems including the first client information handling system (e.g., 250) or candidate offload client information handling systems (e.g., 270, 273) within an enterprise system. For example, in an embodiment described with respect to FIG. 2, client device operational telemetry measurements including power analytics, geographic location, a number of remote processing request calls processed, as well as determined $CO_2$ emissions values particular to each client information handling system (e.g., first client 250 or candidate offload clients 270, 273) may be gathered during routine monitoring periods from a plurality of client information handling systems (e.g., 250, 270, or 273) at the UEM platform 200 executing the enterprise-wide $CO_2$ emissions minimizing load-balancing system 280.

The data collector 261 may routinely collect information from the power analytics module 240 at preset intervals and transmit information received at any given time from the power analytics module 240 and reformatted to a predetermined data interchange format (e.g., JSON) to the load-balancing agent 290. Each JSON incident may include one or more JSON events, each including any information gathered from the power analytics module 240 and a time stamp associated with either the time the analytics module report was generated, current configurations or policies for various hardware components (e.g., 220, 242, 243, 244, 246, or 248), power consumption of those components over a known monitoring time period, geographic location, or a number of remote processing call requests processed, for example.

At block 302, the UEM platform information handling system 200 may include processing resources such as a controller at the load balancing module 283 executing code instructions of the enterprise-wide $CO_2$ emissions minimizing load balancing system 280 to determine a first client $CO_2$ emission value for a first client information handling system 250 and candidate client $CO_2$ emissions values for a plurality of candidate offload client information handling systems 270, 273. The $CO_2$ emissions value is determined for the monitoring period in which each of these operational telemetry measurements were recorded within the JSON incident and then may be included in the JSON incident or another JSON incident. The processing resource, such as a microcontroller executing code instructions at a load-balancing module 290 in an embodiment, may make such a determination based on power consumed during the monitoring period, length of the monitoring period, and pounds of $CO_2$ emitted per kWh of power generated at the power plant providing power to the first client information handling system (e.g., 250). As described herein, $CO_2$ emitted by any given first or candidate client information handling system (e.g., 250, 270, 273) may be dependent upon power consumed during operation of that client information handling system (e.g., first client 250), and geographic location (e.g., India) of the client information handling system (e.g., 250). The amount of $CO_2$ emitted during production of each kilowatt-hour (kWh) of power may vary greatly across different geographic regions. The $CO_2$ optimization engine 285 in an embodiment may transmit location-specific $CO_2$ emissions per kWh consumed for the geographic location of the client information handling system (e.g., 250, 270, or 273) to the client information handling systems or UEM information handling system 200, based on the geographic location for the client information handling system 250, 270, or 273. The processing resource at the load-balancing agent 290 in an embodiment may multiply these received location-specific $CO_2$ emissions (e.g., $CO_2$ pounds per kWh) by the power consumed over a set period of time to determine a first client or candidate client $CO_2$ emissions value for each JSON incident generated by each of the first client or candidate offload client information handling systems. The load-balancing agent 290 may further include such determined $CO_2$ emissions values within each JSON incident prior to transmission of the JSON incidents to the communication agent 281. The load-balancing agent 290 in an embodiment may then transmit the JSON incident to the communication agent 281 of the $CO_2$ emissions minimizing load-balancing system 280.

The $CO_2$ emissions minimizing load-balancing system in an embodiment may determine an average $CO_2$ emissions value for each of the client information handling systems for each of the first client information handling system and the candidate offload client information handling systems at block 306 for triggering redistribution of remote processor call requests across a plurality of candidate offload client information handling systems to minimize $CO_2$ emissions across the entire enterprise. For example, the enterprise-wide $CO_2$ emissions minimizing load-balancing system 280 in an embodiment may refer to training period JSON incidents to determine the $CO_2$ emissions values recorded for each client information handling system (e.g., first client 250 or candidate offload clients 270, 273). The enterprise-wide $CO_2$ emissions minimizing load-balancing system 280 in such an embodiment may then take an average of each of these first client $CO_2$ emissions or candidate client $CO_2$ emissions values for a given first or candidate offload client information handling system within the training period to determine a per-machine peak hour average $CO_2$ emissions value that is specific to that client information handling system (e.g., first client 250 or candidate offload clients 270, 273). Because the training period may occur immediately after initial use of the first client information handling system (e.g., 250), and because power consumption efficiency may decrease as each client information handling system (e.g., 250, 270, 273) ages, the $CO_2$ emitted during the training period may indicate the $CO_2$ emitted while each client information handling system is operating at peak efficiency with respect to its life cycle. As these client information handling systems (e.g., 250, 270, 273) age and consume a greater amount of power to perform the same number of processing calls, it may become appropriate to offload some of these processing calls to other, more power-efficient client information handling systems (e.g., 270, or 273 in other data centers). The enterprise-wide $CO_2$ emissions minimizing load-balancing system 280 in an embodiment may ensure redistribution of remote processor call requests upon such a decline in power efficiency at the first client information handling system by triggering load-balancing redistribution of remote processor calls when a given first client information handling system emits CO2 above this average CO2 emissions value determined for that first client information handling system during the training period.

In some embodiments, the trigger for such a redistribution of remote processing call requests may be an average of first CO2 emissions values and candidate client CO2 emissions values determined during the training period across a plurality of client information handling systems drawing power from sources emitting CO2 per kWh of power produced at roughly the same rate and from diverse power sources. For example, the CO2 load-balancing emissions threshold value for a first client information handling system 250 may be the average of CO2 emissions values determined for a plurality of client information handling systems (e.g., first client 250, and candidate offload clients 270 or 273), where each of the plurality of client information handling systems are located within the same data center. As another example, the CO2 load-balancing emissions threshold value for a first client information handling system 250 may be the average of CO2 emissions values determined for a plurality of client information handling systems (e.g., first client 250, and candidate offload clients 270 or 273), where each of the plurality of client information handling systems are located within the same city. In yet another example, the CO2 load-balancing emissions threshold value for a first client information handling system 250 may be the average of CO2 emissions values determined for a plurality of client information handling systems (first client 250, and candidate offload clients 270 or 273), where each of the plurality of client information handling systems are located within the same country. By setting the trigger for rebalancing of remote processor calls based on such average CO2 emissions values, the enterprise-wide CO2 emissions minimizing load balancing system in embodiments described herein may more evenly distribute CO2 emissions by client information handling systems processing such remote processor call requests within an enterprise system. The method for determining, for each of a plurality of client information handling systems of an enterprise system, a CO2 load-balancing emissions threshold value for triggering execution of processor request load-balancing to minimize CO2 emissions may then end.

Figure 4:
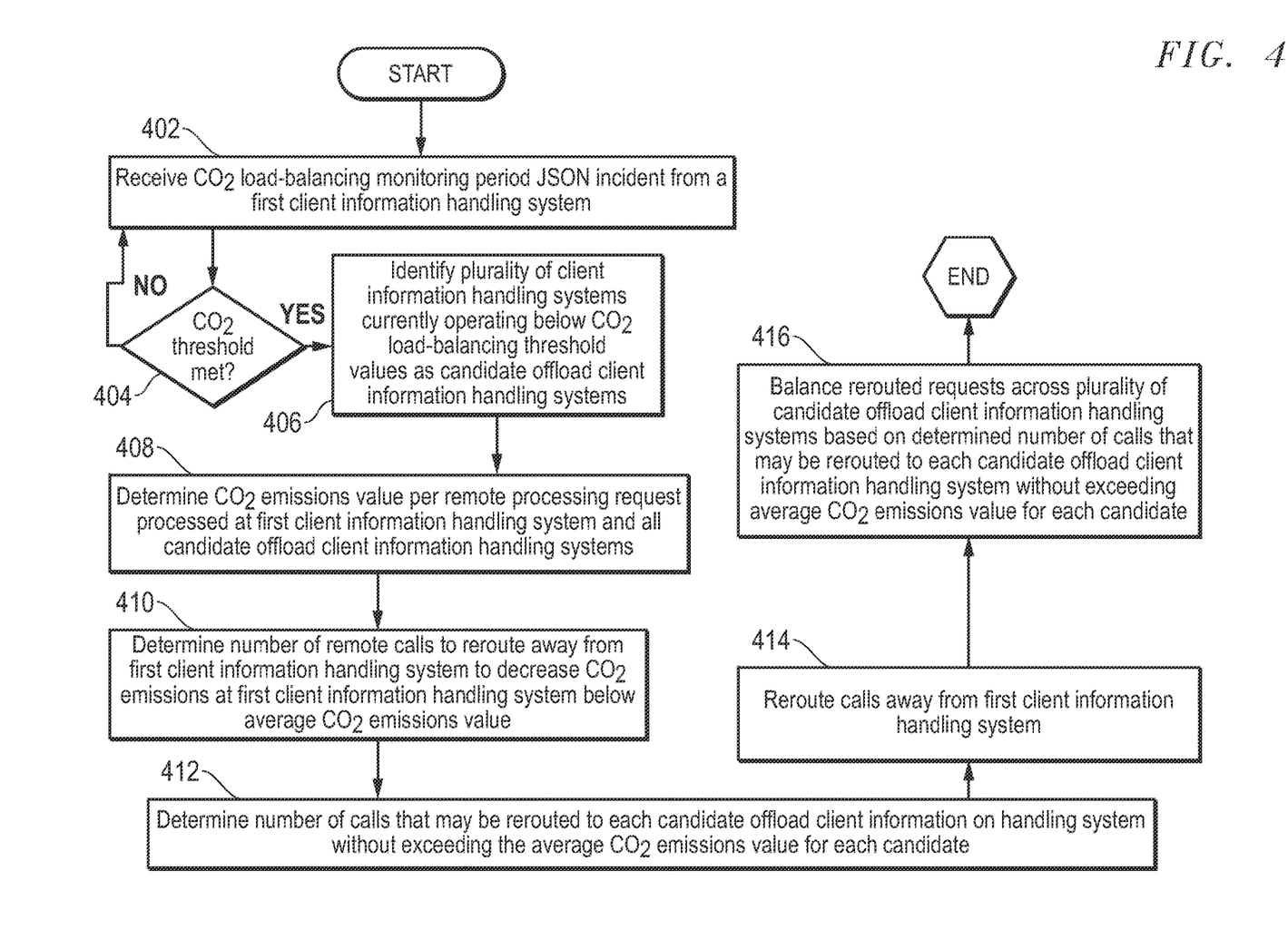
FIG. 4 is a flow diagram illustrating a method of load balancing processor requests across client information handling systems to minimize CO2 emissions across the enterprise according to an embodiment of the present disclosure.

FIG. 4 is a flow diagram illustrating a method of load balancing processor requests across a plurality of client information handling systems to minimize carbon dioxide (CO2) emissions of an enterprise system according to an embodiment of the present disclosure. The method of FIG. 4 may occur in part by hardware processing resources of a UEM platform information handling system executing code instructions of an enterprise-wide CO2 emissions minimizing load balancing system. Upon determination of the CO2 load-balancing emissions threshold value that the enterprise-wide CO2 emissions minimizing load balancing system allows each individual client information handling system to emit CO2, as described above with respect to FIG. 3, the enterprise-wide CO2 emissions minimizing load balancing system may begin routinely monitoring each of a plurality of client information handling systems across many locations of an enterprise system. The plurality of client information handling systems may include a first client information handling system (e.g., 250 of FIG. 2) and candidate offload client information handling systems (e.g., 270 and 273 from FIG. 2). When any one of such client information handling systems begins emitting CO2 above its machine-specific CO2 load-balancing emissions threshold value, the enterprise-wide CO2 emissions minimizing load balancing system in an embodiment generates and transmits a capping instruction to limit the number of remote processing calls routed to the client information handling system, for example a first client information handling system, currently emitting CO2 at a first client CO2 emission value above its machine-specific CO2 load-balancing emissions threshold value. This capping instruction limits the first client information handling system to a maximum number of remote processor call requests that the enterprise-wide CO2 emissions minimizing load-balancing system has determined that the first client information handling system may process while limiting its CO2 emissions to its machine-specific CO2 load-balancing emissions threshold value. In such a way, the enterprise-wide CO2 emissions minimizing load-balancing system may define CO2 emissions value, such as a first client CO2 emissions value, that each client information handling system may emit before triggering a capping limitation instruction of processing requests at that client information handling system in order to minimize CO2 emissions across the entire enterprise.

At block 402, a processing resource at a UEM platform information handling system executing code instructions of an enterprise-wide CO2 emissions minimizing load-balancing system in an embodiment may receive CO2 load-balancing monitoring period JSON incidents from a first client information handling system operating at peak hours. For example, in an embodiment described with reference to FIG. 2, JSON incidents may continue to be generated at the first client information handling system 250 and transmitted to the enterprise-wide CO2 emissions minimizing load-balancing system 280 operating at the UEM platform 200 via execution on one or more hardware processing resources. The load balancing agent (e.g., 290 or 271) code instructions executing via a processing resource operating at each client information handling system (e.g., 250, 270, or 273) may generate and transmit to the UEM platform 200 such monitoring JSON incidents to include some or all previously described operational telemetry measurements (e.g., power analytics and consumption, geographic location, remote processing request load, and determined CO2 emissions values, such as for a client information handling systems 250, 270, or 273, as described above with respect to FIG. 3 at block 302) to determine if the CO2 load-balancing emissions threshold value determined for each specific client information handling system (e.g., 250, 270, or 273) has been met.

The enterprise-wide CO2 emissions minimizing load-balancing system in an embodiment may determine at block 404 whether the CO2 load-balancing emissions threshold value for a specific client information handling system, such as first client information handling system 250, has been met. For example, the enterprise-wide CO2 emissions minimizing load-balancing system 280 may refer to a CO2 load-balancing monitoring period JSON incident received from the first client information handling system 250 to determine whether the determined first client CO2 emissions value meets or exceeds the CO2 load-balancing emissions threshold value determined for that first client information handling system 250 (e.g., as described above with respect to block 312 of FIG. 3) based on the level of CO2 per kWh of power supplied at its local data center. If the determined first client CO2 emissions value meets or exceeds the CO2 load-balancing emissions threshold value for the first client information handling system, this may indicate a need to decrease CO2 emitted by that first client information handling system. The method may then proceed to block 406 for initiation of a load-balancing method to generate instructions to cap processing requests at that first client information handling system and redistribute or reroute processing requests exceeding that cap to other candidate offloading client information handling systems 270, 273 currently emitting less CO2. If the determined CO2 emissions value does not meet or exceed the CO2 load-balancing emissions threshold value for a first client information handling system, this may indicate no current need for such redistribution or capping instructions, and the method may then proceed back to block 402 for routine monitoring of the client information handling system.

At block 406, in an embodiment in which a monitoring period JSON incident includes a determined first client CO2 emissions value identified by the enterprise-wide CO2 emissions minimizing load-balancing system 280 as meeting the CO2 load-balancing emissions threshold value for that client information handling system 250, the enterprise-wide CO2 emissions minimizing load-balancing system may identify a plurality of client information handling systems (e.g., 270, 273) currently operating below their respective CO2 load-balancing emissions threshold values as candidate offload client information handling systems. For example, the load-balancing module 283 may identify one or more other client information handling systems (e.g., 270, or 273) also managed by the enterprise management system 235 as candidates to receive a portion of the remote processing calls currently being routed to the first client information handling system 250, based on telemetry including CO2 emissions values determined based on CO2 per kWh for an energy source for those client information handling systems (e.g., 270 or 273).

The enterprise-wide CO2 emissions minimizing load-balancing system in an embodiment at block 408 may determine a CO2 emissions value per remote processing call request processed at the first client information handling system and all candidate offload client information handling systems. For example, the enterprise-wide CO2 emissions minimizing load-balancing system 280 may determine how much CO2 is emitted per remote processing call request processed by the processor 242 at the client information handling system 250, based on power consumption at the location of the first client information handling system 250. This determination of power consumed per request may also be performed for one or more candidate offload client information handling systems (e.g., 270 and 273) that may be available for redistribution of such remote processing call requests, based on power consumed at each of their respective geographic locations. This determination may be used by the enterprise-wide CO2 emissions minimizing load balancing system 280 to determine a number of remote processing call requests the first client information handling system 250 and candidate offload client information handling systems (e.g., 270 and 273) may be capable of handling before meeting their respective machine-specific CO2 load-balancing emissions threshold values, as described in greater detail below.

At block 410, the enterprise-wide CO2 emissions minimizing load-balancing system 280 in an embodiment may determine a number of remote calls to reroute away from the first client information handling system to decrease first client CO2 emissions at the first client information handling system below the CO2 load-balancing emissions threshold value for the first client information handling system. For example, the enterprise-wide CO2 emissions minimizing load-balancing system 280 in an embodiment may determine, based on the power consumed per processing call request determined for the first client information handling system 250, a maximum processing call request load that the first client information handling system 250 may handle while emitting CO2 at or below the CO2 load-balancing emissions threshold value determined for the first client information handling system. The load-balancing module 283 in an embodiment may operate to determine an optimal method for redistributing a portion of the remote processing calls currently routed to the first client information handling system 250 across one or more of the candidate offload client information handling systems (e.g., including 270 or 273). In order to do so, the enterprise-wide CO2 emissions minimizing load-balancing system 280 may first determine the volume or load of processing requests that may need to be diverted or rerouted from the first client information handling system 250 to ensure the first client information handling system 250 emits CO2 at or below the CO2 load-balancing emissions threshold value determined (e.g., at block 308 of FIG. 3) for the first client information handling system. For example, the enterprise-wide CO2 emissions minimizing load-balancing system 280 in an embodiment may determine, based on the CO2 emitted per processing call request determined for the first client information handling system 250, a maximum processing call request load that the first client information handling system 250 may handle while emitting CO2 at or below the CO2 load-balancing emissions threshold value determined for the first client information handling system. This may provide a target maximum processing request load that becomes the CO2 optimal request load that may be accepted by the first client information handling system 250 to allow the client information handling system 250 to emit CO2 at or below the CO2 load-balancing emissions threshold value for that first client information handling system 250.

The enterprise-wide CO2 emissions minimizing load-balancing system may determine at block 412, for each candidate offload client information handling system, a maximum request load each candidate may accept while staying at or below their respective CO2 load-balancing emissions threshold values. In other words, the enterprise-wide CO2 emissions minimizing load-balancing system 280 in an embodiment may determine the volume or load of processing calls it may reroute from the first client information handling system 250 to any given candidate offload client information handling system (e.g., 270, or 273) before causing the candidate offload client information handling system 270 to emit CO2 above its machine-specific CO2 load-balancing emissions threshold value. Upon identification of all candidate offload client information handling systems (e.g., including 270 and 273), the load-balancing module 283 may determine, based on the CO2 emitted per processing call request determined for each of the candidate offload client information handling systems (e.g., 270 and 273), a number of remote processing call requests that may be rerouted from the first client information handling system 250 to each candidate offload client information handling system (e.g., 270 and 273) while limiting CO2 emitted at each of the candidate offload client information handling systems (e.g., 270 and 273) to the CO2 load-balancing emissions threshold values determined for each of the candidate offload client information handling systems (e.g., 270 or 273). This number of remote processing call requests that may be rerouted from the first client information handling system 250 to each candidate offload client information handling system (e.g., 270 or 273) as described directly above may be referred to herein as a CO2 emissions offload capability or capacity of a candidate offload client information handling system (e.g., 270 or 273) and may represent a $CO_2$ optimal request load for each candidate offload client information handling system (e.g., 270 or 273). Based on this $CO_2$ emissions offload capability determined for each of the candidate offload client information handling systems (e.g., including 270) in an embodiment, the load-balancing module 283 may determine a percentage of the current remote processing request load for the first client information handling system 250 that may be rerouted to each of the candidate offload client information handling systems to minimize $CO_2$ emissions across all client information handling systems (e.g., including 250, 270, and 273) managed by the enterprise management system 235.

At block 414, the enterprise-wide $CO_2$ emissions minimizing load-balancing system in an embodiment may reroute calls away from the first client information handling system to limit $CO_2$ emissions. For example, the load-balancing module 283 may generate and transmit a capping instruction to the load-balancing agent 290 to cap the number of remote processing calls to the processor 242 for client information handling system 250 at the maximum processing call request load that the enterprise-wide $CO_2$ emissions minimizing load balancing system determined is the $CO_2$ optimal request load that the first client information handling system 250 may handle while emitting $CO_2$ at or below the $CO_2$ load-balancing emissions threshold value which has also been determined for the first client information handling system. The load-balancing agent 290 at the client information handling system in such an embodiment may receive and work in tandem with the power analytics module 240 that generates an instruction to cap the resources for the processor 242 for client information handling system 250 that may be available for execution of such received remote processor calls. In such a way, the load-balancing agent 290 and power analytics module 240 may limit the number of remote calls to the processor 242 to a number of calls that is the $CO_2$ optimal request load that the first client information handling system 250 may handle while emitting $CO_2$ below the $CO_2$ load-balancing emissions threshold value determined for the first client information handling system.

In an embodiment at block 416, the enterprise-wide $CO_2$ emissions minimizing load-balancing system may balance rerouted requests across a plurality of candidate offload client information handling systems based on $CO_2$ emissions offload capabilities determined for each of the candidate offload client information handling systems. For example, the load-balancing module 283 may orchestrate rerouting or redistribution any processing requests rejected by the first client information handling system 250 pursuant to such capping of requests at the first client information handling system 250 so as to further minimize $CO_2$ emissions. The load-balancing module 283 may follow any currently known or future developed methods of load-balancing, as informed by the determined $CO_2$ emissions values for each of the candidate offload client information handling systems (e.g., including 270) to perform such a process in an embodiment. For example, the enterprise-wide $CO_2$ emissions minimizing load-balancing system 280 and load-balancing module 283 in an embodiment may prioritize redistribution of rejected processing requests (up to the determined candidate client $CO_2$ emissions offload capability for that candidate) to candidate offload client information handling systems (e.g., including 270) currently emitting less $CO_2$ or currently capable of processing more requests using the same amount of power used by the first client information handling system 250. In another example, such rejected requests may be redistributed to prioritize client information handling systems (e.g., 270, or 273) located in a geographic region that emits less $CO_2$ per kWh of power generated than that of the geographic location for the first client information handling system or other candidate offload client information handling systems. In such a way, the enterprise-wide $CO_2$ emissions minimizing load-balancing system optimally distribute processing requests across a plurality of client information handling systems located at various places or data centers around the planet so as to minimize $CO_2$ emissions.

In an embodiment, the enterprise-wide $CO_2$ emissions minimizing load-balancing system may have determined a per-machine $CO_2$ load-balancing emissions threshold value for the candidate offload client information handling systems that may be used to determine the limits on capacity or a number of additional processing call requests a candidate offload client information handling system can handle. With this, the load balancing module may limit the capacity or number of processing call requests redistributed to each candidate offload client information handling system and redistribute the same accordingly. As described, the per-machine $CO_2$ load-balancing emissions threshold value for the candidate offload client information handling systems may be determined based on average $CO_2$ emissions values across the enterprise or across subsets of candidate offload client information handling systems as described in various embodiments herein. For example, subsets of candidate offload client information handling systems may be based on those located at data centers, within a city, within a country or some other subset determinative designation. The method for load balancing processor requests across a plurality of client information handling systems to minimize $CO_2$ emissions of an enterprise system may then end.

The blocks of the flow diagrams of FIGS. 3 and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An enterprise-wide carbon dioxide (CO2) emissions minimizing load-balancing system executing on a unified endpoint management (UEM) platform information handling system comprising:
a network interface device to receive operational telemetry measurements for a first client information handling system over a CO2 monitoring period, including power analytics, a load of remote processing calls made to a hardware processor, a geographic location, and a determined first client CO2 emissions value for the first client information handling system;
the hardware processor executing code instructions of the enterprise-wide CO2 emissions minimizing load-balancing system to determine when the determined first client CO2 emissions value exceeds a first CO2 load-balancing emissions threshold value;
the hardware processor executing code instructions of the enterprise-wide CO2 emissions minimizing load-balancing system to reject remote processing call requests made to the first client information handling system above a CO2 optimal request load for operation at the first CO2 load-balancing emissions threshold value determined for the first client information handling system based on CO2 emitted per remote processing call request processed at the first client information handling system during the CO2 monitoring period; and
the hardware processor to redistribute the rejected remote processing call requests across a plurality of candidate offload client information handling systems each having a lower candidate client CO2 emissions value.

2. The information handling system of claim 1, wherein the determined first client CO2 emissions value for the first client information handling system is determined based on physical location of the first client information handling system indicating CO2 used in generating power for the first client information handling system.

3. The information handling system of claim 1 further comprising:
the hardware processor to determine a per-machine CO2 load-balancing emissions threshold value that limits a capacity of call requests for distribution to each of the plurality of candidate offload client information handling systems.

4. The information handling system of claim 3 further comprising:
the hardware processor to determine the per-machine CO2 load-balancing emissions threshold value for each of the plurality of candidate offload client information handling systems based on an average of candidate client CO2 emissions values determined for each candidate offload client information handling system, respectively, during a training period preceding the CO2 monitoring period.

5. The information handling system of claim 3 further comprising:
the hardware processor to determine the per-machine CO2 load-balancing emissions threshold value for each of the plurality of candidate offload client information handling systems by taking an average of candidate client CO2 emissions values determined across a subset of the candidate offload client information handling systems located within the same city during a training period preceding the CO2 monitoring period.

6. The information handling system of claim 3 further comprising:
the hardware processor to determine the per-machine CO2 load-balancing emissions threshold value for each of the plurality of candidate offload client information handling systems by taking an average of candidate client CO2 emissions values determined across a subset of the candidate offload client information handling systems located within the same country during a training period preceding the CO2 monitoring period.

7. The information handling system of claim 1 further comprising:
the hardware processor to generate instructions to cap a proportion of the rejected remote processing call requests redistributed to a candidate-specific maximum request load determined for each of the plurality of candidate offload client information handling systems.

8. A method of load-balancing processing requests to minimize carbon dioxide (CO2) emissions by a plurality of enterprise client information handling systems executing on a unified endpoint management (UEM) platform information handling system comprising:
receiving, via a network interface device, operational telemetry measurements for a first client information handling system over a CO2 monitoring period including power analytics, a load of remote processing calls made to a hardware processor, a geographic location, and a determined first client CO2 emissions value for the first client information handling system;
determining, via the hardware processor executing code instructions of the enterprise-wide CO2 emissions minimizing load-balancing system, when the determined first client CO2 emissions value exceeds a first CO2 load-balancing emissions threshold value;
rejecting remote processing call requests made to the first client information handling system above a CO2 optimal request load determined for the first client information handling system based on CO2 emitted per remote processing call request processed at the first client information handling system during the CO2 monitoring period; and
redistributing the rejected remote processing call requests across a plurality of candidate offload client information handling systems.

9. The method of claim 8 further comprising:
redistributing the rejected remote processing call requests across the plurality of candidate offload client information handling systems that have a candidate client CO2 emissions value below a per-machine CO2 load-balancing emissions threshold value that limits a capacity of call requests redistributed to the plurality of candidate offload client information handling systems.

10. The method of claim 9 further comprising:
determining, via the hardware processor, the per-machine CO2 load-balancing emissions threshold value for each of the plurality of candidate offload client information handling systems based on an average of candidate client CO2 emissions values determined for each candidate offload client information handling system, respectively, during a training period preceding the CO2 monitoring period.

11. The method of claim 9 further comprising:
determining, via the hardware processor, the per-machine CO2 load-balancing emissions threshold value for each of the plurality of candidate offload client information handling systems by taking an average of candidate client $CO_2$ emissions values determined across a subset of the candidate offload client information handling systems located within the same country during a training period preceding the $CO_2$ monitoring period.

12. The method of claim 9 further comprising:
determining, via the hardware processor, the per-machine $CO_2$ load-balancing emissions threshold value for each of the plurality of candidate offload client information handling systems by taking an average of candidate client $CO_2$ emissions values determined across a subset of the candidate offload client information handling systems located within the same city during a training period preceding the $CO_2$ monitoring period.

13. The method of claim 8, wherein the determined first client $CO_2$ emissions value of the first client information handling system is determined based on physical location of the first client information handling system indicating $CO_2$ used in generating power for the first client information handling system.

14. The method of claim 8 further comprising:
capping, via the hardware processor, a proportion of the rejected remote processing call requests redistributed to each of the plurality of candidate offload client information handling systems to a candidate-specific maximum request load determined to cap candidate client $CO_2$ emissions value for each of the respective plurality of candidate offload client information handling systems to a level below the per-machine $CO_2$ load-balancing emissions threshold value determined for each of the plurality of candidate offload client information handling systems.

15. An enterprise-wide carbon dioxide ($CO_2$) emissions minimizing load-balancing system executing on a unified endpoint management (UEM) platform information handling system comprising:
a network interface device to receive operational telemetry measurements for a first client information handling system over a $CO_2$ monitoring period, including power analytics, a load of remote processing calls made to a hardware processor, a geographic location, and a first client $CO_2$ emissions value determined for the first client information handling system;
the hardware processor executing code instructions of the enterprise-wide $CO_2$ emissions minimizing load-balancing system to determine, for the first client information handling system and each of a plurality of candidate offload client information handling systems, a $CO_2$ load-balancing emissions threshold value based on average first client and candidate client $CO_2$ emissions values determined over a training period preceding the $CO_2$ monitoring period;
the hardware processor executing code instructions of the enterprise-wide $CO_2$ emissions minimizing load-balancing system to determine when the first client $CO_2$ emissions value exceeds a first $CO_2$ load-balancing emissions threshold value determined for the first client information handling system; and
the hardware processor executing code instructions of the enterprise-wide $CO_2$ emissions minimizing load-balancing system to reject remote processing call requests made to the first client information handling system above a $CO_2$ optimal request load determined for the first client information handling system to limit the first client $CO_2$ emissions value based on $CO_2$ emitted per remote processing call request processed at the first client information handling system during the $CO_2$ monitoring period; and
the hardware processor to redistribute the rejected remote processing call requests across the plurality of candidate offload client information handling systems that have a candidate client $CO_2$ emissions value below a per-machine $CO_2$ load-balancing emissions threshold value that limits the capacity of call request redistribution to each of the plurality of candidate offload client information handling systems.

16. The information handling system of claim 15 further comprising:
the hardware processor to prioritize redistribution of rejected remote processing call requests across a subset of the plurality of candidate offload client information handling systems in candidate geographic locations where less $CO_2$ is emitted per kilo-watt-hour (kWH) of power generated than the geographic location for the first client information handling system.

17. The information handling system of claim 15 further comprising:
the hardware processor to prioritize redistribution of rejected remote processing call requests based on a highest to lowest candidate-specific load redistribution capacity determined for each of the plurality of candidate offload client information handling systems to limit determined candidate client $CO_2$ emissions values for each of the plurality of candidate offload client information handling systems below its respective candidate-specific $CO_2$ load-balancing emissions threshold value.

18. The information handling system of claim 15 further comprising:
the hardware processor to determine the per-machine $CO_2$ load-balancing emissions threshold value for each of the plurality of candidate offload client information handling systems based on an average of candidate client $CO_2$ emissions values determined for each candidate offload client information handling system, respectively, during a training period preceding the monitoring period.

19. The information handling system of claim 15 further comprising:
the hardware processor to determine the per-machine $CO_2$ load-balancing emissions threshold value for each of the plurality of candidate offload client information handling systems by taking an average of candidate client $CO_2$ emissions values determined across a subset of the candidate offload client information handling systems located within the same data center during a training period preceding the monitoring period.

20. The information handling system of claim 15 further comprising:
the hardware processor to determine the per-machine $CO_2$ load-balancing emissions threshold value for each of the plurality of candidate offload client information handling systems by taking an average of candidate client $CO_2$ emissions values determined across a subset of the candidate offload client information handling systems located within the same city during a training period preceding the monitoring period.

* * * * *